US012598233B2

(12) United States Patent  
Ahlberg et al.

(10) Patent No.: US 12,598,233 B2  
(45) Date of Patent: Apr. 7, 2026

(54) METHODS OF REPLACING SENSOR DEVICES

(71) Applicant: Minut AB, Malmö (SE)

(72) Inventors: Fredrik Ahlberg, Lund (SE); Johan Nystrand, Linhamn (SE); Arvid Rudberg, Jönköping (SE)

(73) Assignee: MINUT AB, Malmo (SE)

( * ) Notice: Subject to any disclaimer, the term of this patent is extended or adjusted under 35 U.S.C. 154(b) by 780 days.

(21) Appl. No.: 18/053,591

(22) Filed: Nov. 8, 2022

(65) Prior Publication Data

US 2023/0143780 A1 May 11, 2023

(30) Foreign Application Priority Data

Nov. 9, 2021 (SE) .................................... 2151372-6

(51) Int. Cl.  
H04W 76/20 (2018.01)  
H04L 67/12 (2022.01)  
H04W 4/38 (2018.01)

(52) U.S. Cl.  
CPC .................................... H04L 67/12 (2013.01)

(58) Field of Classification Search  
CPC ..... H04L 67/12; H04L 12/2807; H04L 63/00; H04W 40/18; H04W 40/20; H04W 40/34; H04W 40/22; H04W 76/20; H04W 4/38; H04W 12/00  
See application file for complete search history.

(56) References Cited

U.S. PATENT DOCUMENTS

| | | | | | |
|---|---|---|---|---|---|
| 7,836,360 | B2 * | 11/2010 | Zufelt | ................. | H04L 41/0663 |
| | | | | | 714/49 |
| 9,800,646 | B1 * | 10/2017 | Stamatakis | ............. | H04W 4/80 |
| 9,858,597 | B2 * | 1/2018 | DeWitt | ............. | G06Q 30/0261 |
| 10,542,095 | B2 * | 1/2020 | Katayama | ............. | H04L 67/125 |
| 11,089,107 | B1 * | 8/2021 | Chor | ....................... | H04L 63/08 |

(Continued)

FOREIGN PATENT DOCUMENTS

| | | |
|---|---|---|
| CN | 108964994 A | 12/2018 |
| CN | 110083069 A | 8/2019 |

(Continued)

OTHER PUBLICATIONS

Extended European Search Report dated Mar. 13, 2023 issued in corresponding EP Appln. No. 22205120.3.

*Primary Examiner* — Eyob Hagos  
(74) *Attorney, Agent, or Firm* — Shore IP Group, PLLC; Howard J. Klein

(57) ABSTRACT

A method performed by a first sensor device registered with a processing node via a network comprises steps of: i. detecting a trigger event, ii. broadcasting a signal to a second sensor device and establishing a direct connection between the first sensor device and the second sensor device, iii. transferring identity information and connection information to the second sensor device via the direct connection, the former identifying the first sensor device to the processing node, the latter being used by the first sensor device to connect to the processing node, and iv. receiving confirmation that the second sensor device has been registered with the processing node as a replacement for the first sensor device and removing the connection information from the first sensor device.

18 Claims, 3 Drawing Sheets

(56)                References Cited

U.S. PATENT DOCUMENTS

2010/0061557 A1*   3/2010   Youn .......................... H04L 9/14
                                                        380/279
2017/0082997 A1*   3/2017   Lu ...................... G05B 19/0428
2018/0249228 A1    8/2018   Yoshikawa
2019/0171187 A1*   6/2019   Cella ...................... G06N 3/006
2019/0271956 A1*   9/2019   Slupik .................... H04W 4/38
2020/0111271 A1*   4/2020   Anderson ............. F01N 3/2066
2020/0267528 A1*   8/2020   Stamatakis ............. H04L 41/12
2020/0271488 A1    8/2020   Tanutama
2020/0383032 A1    12/2020  Koga
2021/0005331 A1*   1/2021   Sawada ................. G16Y 20/10
2021/0323155 A1*   10/2021  Lai ......................... B25J 9/1694
2021/0373076 A1*   12/2021  Tung ...................... H04B 3/542
2022/0278893 A1*   9/2022   Isenmann ............. H04L 41/084
2022/0396278 A1*   12/2022  Yezersky ................. G06N 3/08

FOREIGN PATENT DOCUMENTS

CN          110401583  A    11/2019
CN          111930082  A    11/2020
EP            3144914  A1    3/2017
JP            6748374  B2    9/2020

* cited by examiner

METHODS OF REPLACING SENSOR DEVICES

CROSS-REFERENCE TO RELATED APPLICATION

This application claims priority, under 35 U.S.C. 119, from Swedish Application No. 2151372-6, filed Nov. 9, 2021, the disclosure of which is incorporated herein in its entirety.

BACKGROUND

The technology proposed herein relates to the field of methods and devices for automatically replacing a device, connected to a processing node, with a new one due to, for example, a depleted battery. Such technology may, for example, be used in so-called smart home devices. The methods and devices may comprise one or more sensor devices placed in a home and being in connection with a processing node. The devices may be configured to obtain signals from the environment such as information identifying an event.

Today, different types of smart home devices are known. These devices include network-capable video cameras able to record and/or stream video and audio from one location, such as the interior of a home or similar, via network services (internet) to a user for viewing on a handheld device such as a mobile phone. Other smart home devices include sensor devices, i.e., devices configured to sense or measure properties such as temperature, humidity, noise, light, etc. Sensor devices may be powered by mains electricity or by battery. When a battery is depleted, there is a need of battery replacement. Such replacement is cumbersome, as it may require disassembling the device.

Using rechargeable batteries in such devices is advantageous from environmental and economical perspective, and rechargeable batteries can often be charged without disassembling the device. However, charging a depleted battery takes time. The time that may be acceptable for a consumer or user having a single or a few sensor devices, however, is problematic in a commercial setting where a plurality of devices may be used at a plurality of different locations. Specifically, in such a setting recharging a battery would require a worker to manually plug in a charging cable to a sensor device, wait for the charging to conclude, and then disconnect the charging cable. This would disrupt the work efficiency of the worker, who may have to attend to several battery-depleted sensor devices, at different locations, in a single day. Further, if for some reason the sensor device does not function properly after charging, i.e., due to having lost connection to the network it used to transfer its measurements, then it may often be expected that the user or worker attending to the charging of the battery does not have the knowledge to resolve such an issue.

There is accordingly a need for faster methods, devices, and systems for handling a device having a low or depleted battery, or other need for replacement, such that the time period during which the device is unable to perform its function is decreased.

There is further a need for methods, devices, and systems for handling a device having a low or depleted battery, or other need for replacement, which methods, devices and systems can be performed and used with limited or minimum knowledge of the functioning and configuration of the sensor device.

It is thus an object of the technology proposed herein to provide methods, devices, and systems for replacing a sensor device with another sensor device.

It is a further object of the technology proposed herein to provide methods, devices, and systems which allow a first sensor device having a low or depleted battery device, or other need for replacement, to be replaced by a second sensor device having a full or charged battery.

It is a further object of the technology proposed herein to provide methods, devices, and systems in which a first sensor device, registered with a processing node, can be replaced by a second sensor device.

SUMMARY

At least one of the above-mentioned objects are, according to a first aspect of the technology proposed herein, achieved by a method performed by a first sensor device registered with a processing node via a network, the method comprising steps of:

i. detecting a trigger event, ii. broadcasting a signal to a second sensor device and establishing a direct connection between the first sensor device and the second sensor device, iii. transferring identity information and connection information to the second sensor device via the direct connection, wherein the identity information identifies the first sensor device to the processing node, and the connection information is used by the first sensor device to connect to the processing node, and iv. receiving confirmation that the second sensor device has been registered with the processing node as a replacement for the first sensor device and removing the connection information from the first sensor device.

The technology proposed herein is thus based on the recognition that, in order to replace a first sensor device with a second sensor device, it is advantageous to provide a direct connection between the first and second sensor devices for transferring identity information and connection information. This does away with the need for a user to manually configure the second sensor device for connecting the second sensor device to the network and for registering it with the processing node. This allows the first sensor device to be easily replaced, for example if the first sensor device is faulty, has low battery, or is obsolete, without the need for manual configuration, and accordingly without the need for involving any special skills and without the need of disclosing connection details to the user or worker performing the replacement.

The first sensor device may transfer the identity information and the connection information spontaneously. Alternatively, the first sensor device may transfer the identity information and the connection information as a response to a request from the second device.

The first sensor device is typically a smart home device such as a fire detector, a network camera, or a network sensor. The first sensor device may comprise one or more sensors for monitoring and/or detecting or measuring one or more of barometric pressure, acceleration, infrared light, visible light, Doppler radar, radio transmission, air particle concentration, temperature, humidity, movement, sound, and radio transmissions in a locale such as a house, home or office.

The first sensor device is preferably battery-powered by a rechargeable battery and includes a processor, memory, and circuitry and antenna for wireless communication with the processing node via a network such as wireless local area network (WLAN) as for example the internet.

The processing node may be realized on one or more physical or virtual servers, including at least one physical or virtual processor, in a network, such as a cloud network. The processing node may also be called a backend service.

Registered with the processing node means that the identity of the first sensor device is registered in the processing node or in a memory storage accessible by the processing node. The registration of the first sensor device with the processing node allows the processing node to be configured to store, process, and transfer sensor data obtained by the first sensor device. Sensor data obtained by the sensors in the first sensor device are thus transferred from the first sensor device to the processing node via the network. The processing node may store and/or process the sensor data, and further transfer or make available the sensor data to further services, such as a user account or a user application configured to display the sensor data to a user. The user application may be a webpage interface, but is typically an application running on a mobile phone or other mobile device.

Thus, in one example a user obtains the first sensor device and positions it in a home and connects it to his home network, i.e., his home WLAN (Wi-Fi) using connection information relating to credentials for connecting to the home network, as well as information used to connect to the processing node. The user then creates an account with a service running on the processing node or running on a server having access to the processing node. The first sensor device is then registered, using the identity information, with the processing node as being associated with the user's user account, whereafter the sensor data from the first sensor device becomes available to the user.

After some time, the user may find that the first sensor device needs to be replaced, for example due to having a low battery. The technology proposed herein thus allows the user to replace the first sensor device with the second sensor device without having to manually connect the second sensor device to the network, and without having to manually register the second sensor device with the processing node. This saves time for the user and further allows the replacement to be performed without having access to the connection details.

Thus, whereas the user, when connecting the first sensor device to the network might have needed to input connection information manually into the first sensor device, such as by manually inputting the network name and password to his home network, as well as the address to the processing node, in some cases even requiring a wired connection between the first sensor device and a home computer, there is no need for such manual work when replacing the first sensor device with the second sensor device.

Further, whereas the user might have needed to participate in the registration of the first sensor device with the processing node, such as for example by inputting identity information of the first sensor device to the processing node or to the user account, this is not needed when the second sensor device is registered with the processing node.

Additionally, whereas the user might not wish to disclose the connection details to any third party, which third party could otherwise assist in replacing the first sensor device, the technology proposed herein allows the connection information to be transferred directly between the first and second sensor devices without having to be disclosed to the person or entity performing the replacement.

The above discussed advantages are even more pronounced where the user has a plurality of first sensor devices, for example in a plurality of apartments or holiday homes. In such cases the technology proposed herein allows the user, or any of the user's employees, to easily replace any first sensor device that needs replacement, such as for example due to a low battery, with a second sensor device. Further, as the connection information is removed from the first sensor device after it has been replaced by the second sensor device, the first sensor device can be recharged, updated, and/or repaired as needed, and then be used as a second sensor to replace another first sensor device, for example in another one of the plurality of apartments or holiday homes.

The network preferably comprises a wireless local area network (WLAN), e.g., Wi-Fi. The network may comprise other wireless networks such as cellular networks (LTE, NB-IoT).

The WLAN is typically connected to the processing node via other networks such as a local area network (LAN) and/or wide area network (WAN). The network typically comprises at least one access point, in particular a wireless access point, to which the first sensor device can connect. Via the network means that the first sensor device, in normal operation, is capable of communicating with the processing node via the network.

The trigger event may be any type of event detectable by the first sensor device. The trigger event may comprise a combination of two or more trigger events being detected, simultaneously or sequentially. Additionally, the trigger event may comprise a plurality of trigger events in step (i).

The trigger event to be detected by the first sensor device may be configured into the circuitry or firmware of the first sensor device, or may alternatively be set by the processing node and/or the user of the first sensor device. This may be advantageous when the user desires to adapt the trigger event to how and where the first sensor device is used. It may for example be desired to use a specific trigger event, or combination of trigger events, to increase security, whereas certain trigger events are not suitable in certain environments (e.g., movement not being suitable for a sensor device in a boat or an RV.)

The broadcasted signal may be any type of signal that is suitable for establishing a connection to the second sensor device. The signal could be an optical signal, or audio signal, but is preferably a radio signal, more preferably Bluetooth signal, most preferably a Bluetooth Low Energy (BLE) signal. The signal contains data identifying the first sensor device as a potential target for replacement. Preferably the first sensor device stores a first timestamp corresponding to the time when the trigger event was detected. The signal is broadcast following the detection of the trigger event.

The second sensor device is preferably identical to the first sensor device in terms of functions and construction and capabilities. The second sensor device may however comprise additional or upgraded sensors, circuitry, and/or battery. Typically, however, the first and second sensor devices are identical, such that the first sensor device, once replaced by the second sensor device and recharged, can be used as a second sensor device to replace another first sensor device.

The direct connection between the first and second sensor devices may be a connection via any of the signals broadcasted by the first sensor device described above. The connection is direct, which means that the communication between the first and second sensor devices does not pass via an active third party such as a gateway, Wi-Fi-network, other network, the internet, or the processing node. The advantage of the direct connection is that it allows a communication between the sensor devices without the need for manually configuring the second sensor to connect to the network. The second sensor may thus be in a non-configured state, i.e., being configured according to its factory settings. The methods according to the technology proposed herein thus allows the replacement of the first sensor device with a second sensor device chosen arbitrarily from a plurality of second sensor devices obtained in bulk, and without the need for configuring each of the second sensor devices.

Once the direct connection is established, the first sensor device transfers identity information and connection information to the second sensor device via the direct connection.

The identity information identifies first sensor device to the processing node. This information is later used by the second sensor device to inform the processing node which first sensor device it is to replace. The identity information typically comprises a serial number such as a MAC-address which is unique for the first sensor device.

The connection information is used by the first sensor device to connect to the processing node. The connection information thus may comprise the name of the network (that the first sensor device is connected to) as well as the security type and passcode to the network. Alternatively or additionally, the connection information comprises information used by the first sensor device to connect to the processing node, such as backend port and backend address. If the connection information does not comprise information needed to connect to the network, but only information needed to connect to the processing node, then the second sensor device must be capable of reaching the processing node via an inbuilt network adapter, such as a cellular network adapter.

Once the second sensor device has been registered with the processing node as a replacement for the first sensor device, the first sensor device should receive confirmation to this effect. The confirmation is preferably received from the second sensor device via the direct connection as this increases the security of the method because only a second sensor device capable of establishing the direct connection, and being capable of receiving the confirmation from the processing node, can then complete the replacement. As an alternative, however, the confirmation may be obtained by the first sensor device from the processing node via the network.

The confirmation is preferably the result of a cryptographic operation configured to prove to the processing node that the second sensor device is allowed to replace the first sensor, that the second sensor device has the direct connection with the first sensor device, and to prove to the first sensor device that the second sensor device has been registered as its replacement.

The second sensor may for example comprise a device specific secret, which secret can be calculated and verified by the processing node using a master key operating on the second sensor device's identity information.

The example implementation described herein shows a possible authentication method. A similar authentication method can also be implemented using public key encryption and a public key infrastructure, where each entity has a certificate and private key for signing challenges, and where each certificate is also signed by a trusted central authority.

When the first sensor device has received the confirmation, it should remove the connection information. This ensures that the connection information, which typically contains sensitive data such as a password to connect to the network and/or to the processing node, is not disseminated.

In one scenario the replacement of the first sensor device may for example be performed by employees of a service company that perform replacement of first sensor devices for several different users. By removing the connection information from a first sensor device removed from a house associated with a first user, the first sensor device can be recharged, and then used as a second sensor device when replacing a first sensor device in a house associated with a second user, without any sensitive connection information potentially leaking from the first user to the second user. Further, by removing the connection information from the first sensor device, it is ensured that the first sensor device does not transfer any information to the processing node after the replacement. This is advantageous as only the information from the intended sensor device is transferred, thereby decreasing information transfer load, and securing the correctness of the information transferred. Moreover, by removing the connection information from the first sensor device, it is ensured that the first sensor device may only be replaced by a single second sensor device per replacement occasion. Further, removing the connection information from the first sensor device is advantageous as it decreases risk of transferring sensitive information from the first sensor device after the replacement. Preferably, step (iv) comprises removing or resetting all user configurable settings from the first sensor device. More preferably step (iv) further comprises resetting the first sensor device to a non-configured state, e.g., to factory settings.

Additionally, when the first sensor device removes the connection information it generally will also disconnect from the network. Alternatively, step (iv) may comprise the substep of disconnecting from the network if the first sensor device is connected to the network at the time that the method is carried out.

Preferably a step of authenticating the second sensor device to the first sensor device follows step (ii) or is comprised by step (ii) and/or step (iii).

Thus, the step of authenticating the second sensor device to the first sensor device may be based on a shared secret built into all sensor devices. The example implementation described herein shows a possible authentication method. Alternatively the step of authenticating the second sensor device to the first sensor device may be based on public key encryption and a public key infrastructure, where each device has a certificate and private key for signing challenges, and where each certificate is also signed by a trusted central authority.

Although step (iv) is advantageous for simplicity, as it allows the first sensor device to be easily reused as a second sensor device, it is contemplated within the context of the technology proposed herein that step (iv) may be made optional as steps (i)-(iii) per se obtain the aim of replacing the first sensor device with the second sensor device in a way which still obtains at least one of the objects of the technology proposed herein.

Preferably the trigger event comprises one or more of:
detecting that the first sensor device is moved by a user,
detecting that the first sensor device is disconnected from a mounting surface, such as a mounting plate,
detecting a user input to the first sensor device,
detecting a reboot of the first sensor device following a shutdown thereof,
detecting that the second sensor device is in proximity to the first sensor device, and
detecting a need for replacement of the first sensor device.
As noted above, the trigger event may comprise a plurality of simultaneous or sequential trigger events.

One example is where the trigger event comprises detecting that the first sensor device is disconnected from a mounting surface in combination with detecting that the second sensor device is in proximity to the first sensor device.

Movement of the first sensor device by a user may be detected for example using an accelerometer or an air pressure sensor.

A user input to the first sensor device may comprise a movement, such as shaking or turning the first sensor device upside down. The first sensor device may further comprise a switch or button operable by the user.

The first sensor device may be configured such that each reboot or boot of the first sensor device is a trigger event. Preferably however, only reboots or boots following shutdown due to low battery or malfunction should serve as a trigger event. Additionally, a trigger event relating to a reboot may further comprise detecting the first sensor device is connected to a charger.

The proximity of the second sensor device to the first sensor device may be detected using the audible signals, or using the signal strength of any signal broadcasted by the second sensor device.

More preferably the trigger event comprises detecting the disengagement of the first sensor device from a mounting plate. The first sensor device is thus preferably mounted on a wall or on a ceiling using a mounting plate affixed, by adhesive, screws, or nails, to the wall or ceiling. The mounting plate and the first sensor device preferably interface, such as by inter-engaging slots and protrusions, or magnets and ferromagnetic materials, allowing the first sensor device to be releasably attached to the mounting plate. The first sensor device may thus comprise a switch or sensor configured to be activated when the first sensor device is detached from the mounting plate. The switch or sensor may be mechanical so as to physically be actuated by the removal, magnetic so as to sense and be actuated by a difference in a magnetic field when the first sensor device is removed, or optical so as to detect a difference in light conditions following the removal of the first sensor device from the mounting plate. Other ways of configuring and actuating the switch or sensor include measuring acceleration and/or movement when the first sensor device is removed.

The detecting of the trigger event may be performed by a dedicated circuit and switch or sensor, or may alternatively be detected by the same processor and circuitry of the first sensor device that handles the general processes for the first sensor device, i.e., communicating with the processing node for collecting and sending sensor data or other information to the processing node.

Preferably the trigger event comprises detecting a need for replacement of the first sensor device.

This is advantageous in that it improves security because the replacement of the first sensor device is then only possible if there is a need for replacement.

The need for replacement of the first sensor device preferably comprises one or more of:
- an indication of low battery in the first sensor device,
- an indication of a dysfunction of the first sensor device, and
- an indication of exceeding a predetermined lifetime of the first sensor device.

This is advantageous in that it improves security because the replacement of the first sensor device is then only possible in these situations. Preferably the trigger event in these cases comprises a combination of detecting a need for replacement such as listed above (e.g., an indication of a low battery), and detecting a trigger event as listed further above (e.g., detecting that the first sensor device is disconnected from a mounting surface).

This provides convenience for the user of the device which will then be abled to, for example, remove the first sensor device temporarily, e.g., for cleaning, without initiating the method according to the first aspect of the technology proposed herein.

Preferably, when a need for replacement is used as a trigger event, the method further comprises the steps of:
- v. querying the second sensor device regarding the second sensor device's ability to meet the need for replacement,
- vi. receiving a response from the second sensor device regarding the second sensor device's ability to meet the need for replacement, and
- vii. determining that the second sensor device is able to meet the need for replacement,
- wherein the steps are performed prior to step iii.

This is advantageous as it ensures that the first sensor device is not replaced by a second sensor device that is not likely to be able to provide that the time period during which the first sensor device is unable to perform its function is decreased.

Determining that the second sensor device is able to meet the need for replacement may for example comprise comparing battery levels, functional status, and/or build date or firmware version between the first and second sensor devices.

The step of determining that the second sensor device is able to meet the need for replacement may comprise detecting that the second sensor device has a higher battery level than the first sensor device. Alternatively, or additionally, the determining step may comprise a step of detecting that the second sensor device has a more recent fabrication date and/or firmware version than the first sensor device. A higher battery level and fabrication date and/or firmware version can be detected by querying the second sensor device by the first sensor device.

Preferably the direct connection is a radio connection, such as a Bluetooth connection, an NFC connection, or an IR connection. More preferred the direct connection is a short-range connection, such as a Bluetooth connection, having a range of less than 10 meters.

At least one of the above-mentioned objects is further obtained by a second aspect of the technology proposed herein relating to a method performed by a second sensor device, the method comprising steps of:
- i. receiving a broadcasted signal from a first sensor device and establishing a direct connection between the first sensor device and the second sensor device,
- ii. receiving identity information and connection information from the first sensor device via the direct connection, wherein the identity information identifies the first sensor device to a processing node, and the connection information is used by the first sensor device to connect to the network,
- iii. connecting to the processing node using the connection information and requesting the registration of the second sensor device with the processing node as a replacement for the first sensor device using the identity information and identity information identifying the second sensor device, and iv. transferring, to the first sensor device, a confirmation that the second sensor device has been registered with the processing node as a replacement for the first sensor device.

The descriptions of steps and features mentioned in the method according to the first aspect of technology proposed herein apply also to the steps and features of the methods according to the second aspect of the technology proposed herein.

The second sensor device is, as noted above, preferably identical to the first sensor device. As further noted above, the second sensor device preferably performs an authentication with the first sensor device as part of step (i) or (ii).

Once the connection information has been received, the second sensor device becomes capable of connecting to the processing node. As noted earlier, there is no need for manually configuring the second sensor device in order to connect it to the network. There is further, as also noted earlier, no need to disclose the connection information to the worker or user performing the replacement of the first sensor device.

After connecting to the network, the second sensor device contacts the processing node with a request to register the second sensor device with the processing node as a replacement for the first sensor device. The request comprises the identification information from the first sensor device and identification information of the second sensor device. The request may further comprise information for authenticating the second sensor device to the processing node, as described earlier. Once the registration is completed, the second sensor device transfers the confirmation. The confirmation may be received from the processing node, or may alternatively be created by the second sensor device. Although preferred, it is further contemplated within the context of the technology proposed herein that step (iv) may be dispensed with.

The method according to the second aspect of the technology proposed herein has a special advantage when the first sensor device is incapable, such as due to low battery or malfunction, to communicate effectively via the network with the processing node. By having the second sensor device perform the registering with the processing node, the requirement on the first sensor device is merely to be able to communication with the second sensor device via the direct connection, which typically has less power requirements, e.g., by being a Bluetooth or low power radio connection, as compared to the energy requirements of connecting and communicating with the processing node via the network. This also applies when the first sensor device has ceased functioning due to a completely depleted battery where it is enough that the first sensor device is booted up to a state where it can establish the direct connection in order to replace it.

Preferably, the method further comprises the steps of:
v. receiving, from the first sensor device, a query regarding the second sensor device's ability to meet a need for replacement, and
vi. transferring, to the first sensor, a response regarding the second sensor device's ability to meet the need for replacement.

As discussed earlier, the need for replacement may include one or more of low battery level, malfunction, age or version of the first sensor device. The response may thus include one or more of battery level, functional status, age and or version of the second sensor device.

Alternatively, the second sensor device may transfer information regarding the second sensor device's ability to meet the need for replacement, without an antecedent query from the first sensor device. In that case the first sensor device may then once it has received the information, determine that the second sensor device is able to meet the need for replacement.

As a further alternative to the first sensor device querying the second sensor device as described above, the reverse arrangement is also possible.

In the reverse arrangement, the method according to the second aspect of the technology proposed herein further comprises the steps of:
v. querying the first sensor device regarding the need for replacement of the first sensor device,
vi. receiving a response indicating the need for replacement from the first sensor device,
vii. determining that the second sensor device is able to meet the need for replacement.

Conversely, in the reverse arrangement, the method according to the first aspect of the technology proposed herein further comprises the steps of:
v. receiving, from the second sensor device, a query regarding the first sensor device's need for replacement
vi. transferring, to the second sensor device, a response indicating the need for replacement.

At least one of the above-mentioned objects is further obtained by a third aspect of the technology proposed herein relating to a method performed by a processing node the method comprising steps of:
i. receiving from a second sensor device a request to register the second sensor device as a replacement for a first sensor device, the request comprising identity information identifying the first sensor device and identity information identifying the second sensor device,
ii. determining, based on the identity information identifying the first sensor device and/or based on the identity information identifying the second sensor device, that the first sensor device is allowed to be replaced by the second sensor device,
iii. registering the second sensor device as a replacement for a first sensor device, and
iv. transferring, to the second sensor device, a confirmation that the second sensor device has been registered with the processing node as a replacement for the first sensor device.

The descriptions of steps and features mentioned in the method according to the first and second aspects of the technology proposed herein apply also to the steps and features of the method according to the third aspect of the technology proposed herein.

The request may further comprise information showing that the second sensor device is authorized to replace the first sensor device and to be registered with the processing node. Such information may include a device specific secret unique to the second sensor device and computable by the processing node using a master key and the identity information identifying the second sensor device as described above. It is further contemplated within the context that the request may be received from the first sensor device. Alternatively, the request may be received from both the first sensor device and the second sensor device and together form a joint request. Such request further increases security during device replacement.

The processing node determines that the first sensor device is allowed to be replaced by the second sensor device. The processing node may thus evaluate whether the method according to the first aspect of the technology is to be allowed for the first sensor device. Preferably the processing node is configured to receive, and store, a selection made by the user of the first sensor device as to whether the first sensor device is allowed to be replaced. The processing node may for example be configured to allow replacement of the first sensor device at certain times, or after a certain time has passed since the first registration of the first sensor device with the processing node.

The processing node may further be configured to assess whether the second sensor device is of a type allowing it to replace the first sensor device.

Although preferred for reasons of security, it is contemplated within the context of the technology proposed herein that step (ii) may be dispensed with.

Registering the second sensor device as a replacement for the first sensor device allows measurement data from the second sensor device to be properly routed to the user having performed the initial registration of the first sensor device, as described initially.

The confirmation is preferably transferred to the second sensor device for security reasons, such that the second sensor device can only transfer the confirmation to the first sensor device if it is within the range of the direct connection with the first sensor device.

At least one of the above-mentioned objects is further obtained by a fourth aspect of the technology proposed herein relating to a first sensor device comprising circuitry configured to perform the method according to the first aspect to the technology proposed herein.

The first sensor device is preferably configured as described earlier.

At least one of the above-mentioned objects is further obtained by a fifth aspect of the technology proposed herein relating to a second sensor device comprising circuitry configured to perform the method according to the second aspect of the technology proposed herein The second sensor device is preferably configured as described earlier.

At least one of the above-mentioned objects is further obtained by a sixth aspect of the technology proposed herein relating to a processing node comprising circuitry configured to perform the method according to the third aspect of the technology proposed herein.

The processing node is preferably configured as described earlier.

At least one of the above-mentioned objects is further obtained by a seventh aspect of the technology proposed herein relating to a system comprising at least one first sensor device according to the fourth aspect of the technology proposed herein and at least one processing node according to the sixth aspect of the technology proposed herein, and preferably also at least one second sensor device according to the fifth aspect of the technology proposed herein.

An eighth aspect of the technology proposed herein relates to a computer program comprising instructions which, when executed on at least one processor in a first sensor device, causes the first sensor device to carry out the method according to the first aspect of the technology proposed herein.

A ninth aspect of the technology proposed herein relates to a computer program comprising instructions which, when executed on at least one processor in a second sensor device, causes the second sensor device to carry out the method according to the second aspect of the technology proposed herein.

A tenth aspect of the technology proposed herein relates to a computer program comprising instructions which, when executed in a processing node, causes the processing node to carry out the method according to the third aspect of the technology proposed herein.

An eleventh aspect of the technology proposed herein relates to a carrier comprising the computer program according to any of the eighth to tenth aspects of the technology proposed herein, wherein the carrier is one of an electronic signal, an optical signal, a radio signal and a computer readable storage medium.

BRIEF DESCRIPTION OF THE FIGURES AND DETAILED DESCRIPTION

A more complete understanding of the abovementioned and other features and advantages of the technology proposed herein will be apparent from the following detailed description of preferred embodiments in conjunction with the appended drawings, wherein.

In the below description of the figures the same reference numerals are used to designate the same features throughout the figures.

Figure 1:
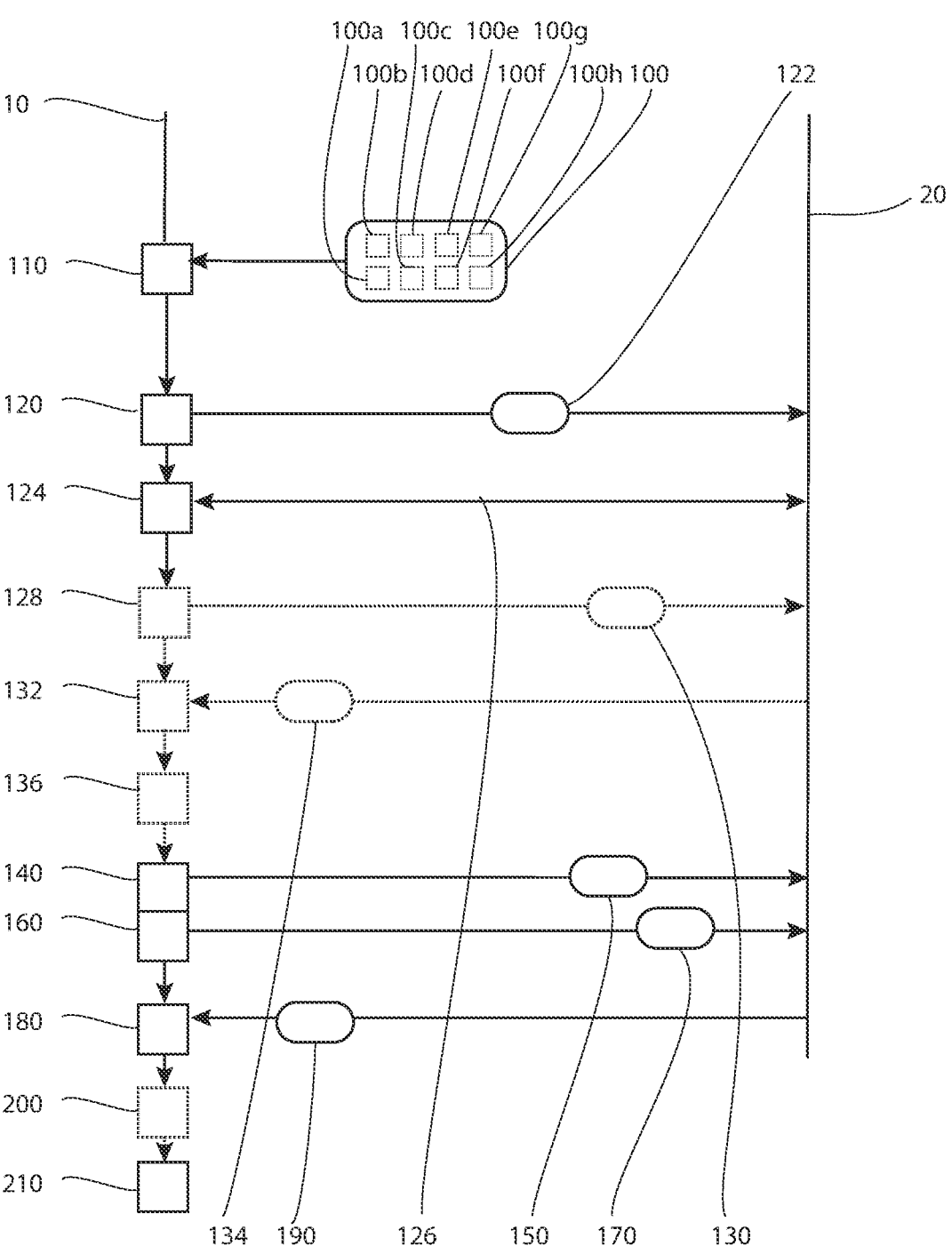
FIG. 1 shows the method according to the first aspect of the technology proposed herein performed by a first sensor device.

FIG. 1 shows the method according to the first aspect of the technology proposed herein performed by a first sensor device 10. The figure depictures steps of the method in relation to the first sensor device 10 and a second sensor device 20, focusing on the steps related to the first sensor device 10. In this example, the first sensor device 10 and the second sensor device 20 are smart home devices for monitoring movement and sound and are powered by a rechargeable battery. The devices each have a processor, memory, and circuitry. The circuitries are configured to perform the method according to, respectively, the first and the second aspects of the technology. The first sensor device 10 and the second sensor device 20 have each a computer program comprising instructions which, when executed on a processor of the respective device causes the respective sensor device to carry out the method according to the first and the second aspects, respectively, of the technology proposed herein. In this example, a carrier comprising the computer program is a computer readable storage medium.

The first sensor device 10 is registered with a processing node 30 (shown in FIGS. 2, 3 and 4) via a network, here being a home WLAN or Wi-Fi and the internet, such that the identity of the first sensor device 20 is registered in a memory storage accessible by the processing node 30. The registration is performed when the user creates an account with a service running on the processing node 30. The registration of the first sensor device 10 involves using the identity information, with the processing node 30 associated with the user's account. Thereby, the sensor data from the first sensor device 10 become available to the user. Here, the processor node 30 is realized as a physical processor. The processing node 30 has circuitry configured to perform the method according to the third aspect of the technology proposed herein. Obtained sensor data regarding movement and sound, monitored by the first sensor device 10, are transferred from the first sensor device 10 to the processing node 30 via the network and are stored and processed in the processing node 30. The data are made available to a user via a mobile phone 40 running a user interface (shown in FIG. 4).

In the example illustrated in FIG. 1, the first sensor device 10, which is positioned in a home of a user, detects a trigger event 100. The trigger event 100 may comprise one or more of:

detecting 100a that the first sensor device 10 is moved by a user, detecting 100b that the first sensor device 10 is disconnected from a mounting surface, such as a mounting plate, detecting 100c a user input to the first sensor device, detecting 100d a reboot of the first sensor device following a shutdown thereof, detecting 100e that the second sensor device is in proximity to the first sensor device, detecting 100f a low battery in the first sensor device 10, detecting 100g an indication of a dysfunction of the first sensor device 10, and detecting 100h an indication of exceeding a predetermined lifetime of the first sensor device 10.

Subsequently to detecting 110 the trigger event 100, the first sensor device 10 broadcasts 120 a signal 122. The signal 122 is broadcast for establishing a direct connection 126 between the first sensor device 10 and the second sensor device 20. The signal 122 is received by the second sensor device 20.

In this example, the first sensor device 10 optionally sends 128 a query 130 to the second sensor device 20 regarding the second sensor device's 20 ability to meet a need for replacement, e.g., the trigger events 100f, 100g, and 100h. A response 134 from the second sensor device 20 is then received 113 by the first sensor device 10. Subsequently, the first sensor device 10 determines 136 that the second sensor device 20 is able to meet the need for replacement.

Subsequently to establishing 124 the direct connection 126 between the first sensor device 10 and second sensor device 20, identity information 150 is transferred 140 from the first sensor device 10 to the second sensor device 20. The identity information 150 identifies the first sensor device 10 to the processing node 30. Further, connection information 170 is transferred 160 from the first sensor device 10 to the second sensor device 20. The connection information 170 is used by the first sensor device 10 to connect to the processing node 30. In the next step, the first sensor device 10 receives 180 a confirmation 190 that the second sensor device 20 has been registered with the processing node 30 as a replacement for the first sensor device 10. Following receipt of the confirmation 190, the first sensor device 10 removes 210 the connection information 150 from itself, and preferably also disconnects 200 from the network.

Figure 2:
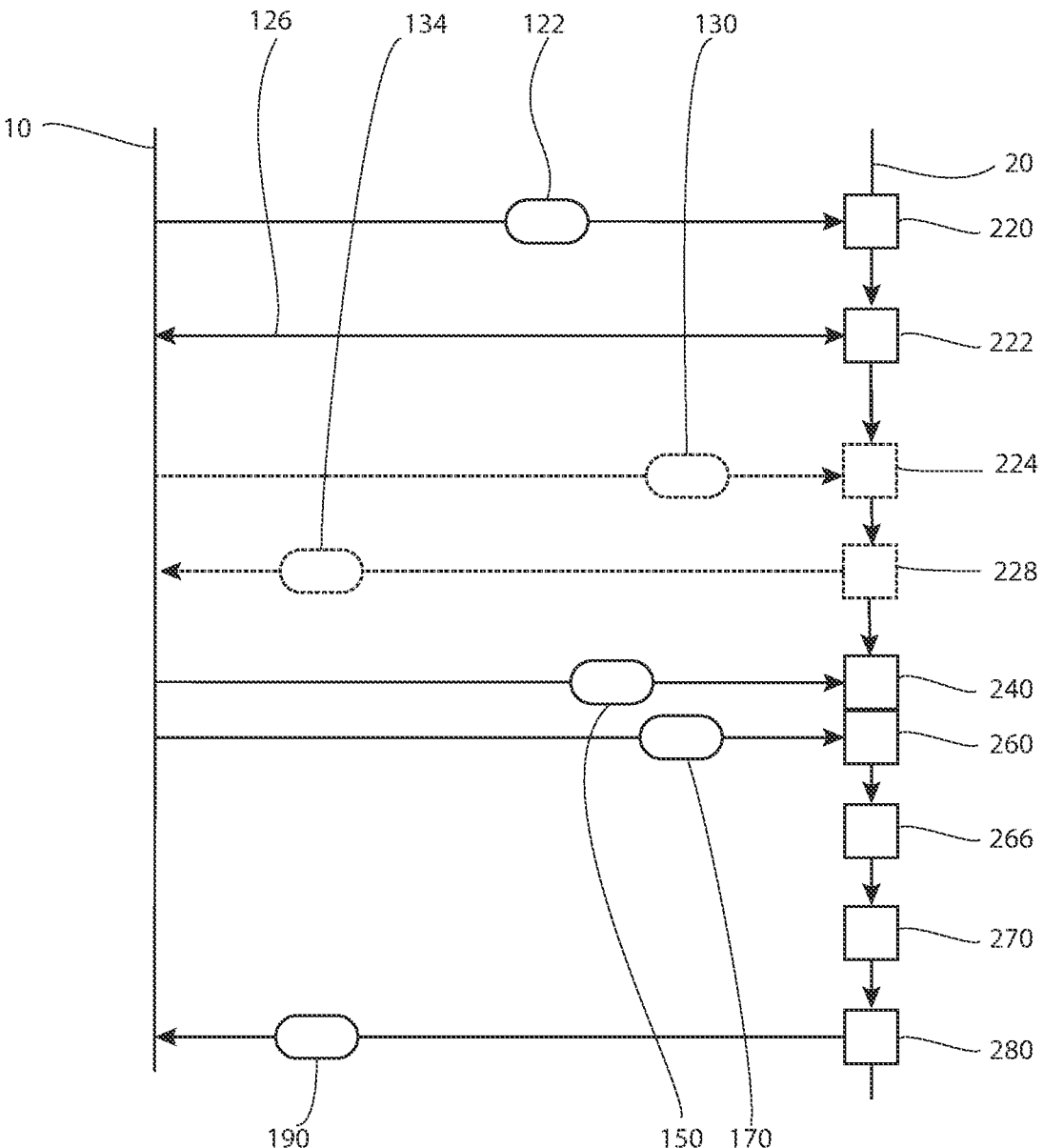
FIG. 2 shows the method according to the second aspect of the technology proposed herein being performed by a second sensor device.

FIG. 2 shows an example of the method according to the second aspect of the technology proposed herein performed by the second sensor device 20. The figure depicts steps of the method in relation to the first sensor device 10 and the second sensor device 20, focusing on the steps performed by the second sensor device 20.

The second sensor device 20 receives 220 a signal 122 broadcast from a first sensor device 10. The direct connection 126 is then established 222 between the first sensor device 10 and the second sensor device 20.

In this example, the second sensor device 20 optionally receives 224 the query 130 regarding the second sensor device's 20 ability to meet a need for replacement from the first sensor device 10. In the next optional step, the second sensor device 20 transfers 228 the response 134 regarding the second sensor device's 20 ability to meet the need for replacement. Next, the identity information 150 and the connection information 170 are received 240, 260 by the second sensor device 20. The second sensor device 20 connects 266 to the processing node 30 and requests 270 the registration 270 of the second sensor device 20 with the processing node 30 as a replacement for the first sensor device 10 using the identity information 150. In the next step, the second sensor device transfers 280, to the first sensor device 10, a confirmation 190 that the second sensor device 20 has been registered with the processing node 30 as a replacement for the first sensor device 10.

Figure 3:
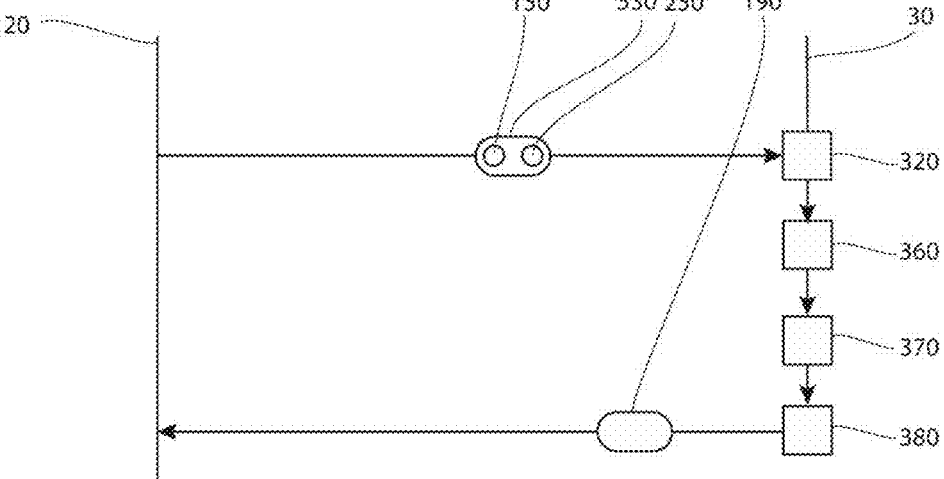
FIG. 3 shows the method according to the third aspect of the technology proposed herein being performed by a processing node.

FIG. 3 shows the method according to the third aspect of the technology proposed herein performed by the processing node 30. The figure illustrates steps of the method in relation to the second sensor device 20 and the processor node 30, focusing on the steps performed by the processor node 30.

The processor node 30 receives 320 from a second sensor device 20 a request 330 to register 270 the second sensor device 20 as a replacement for a first sensor device 10. The request 330 comprises identity information 150 identifying the first sensor device 10 and identity information 250 identifying the second sensor device 20. In the next step, the processing node 30 determines 360, based on the identity information 150 identifying the first sensor device 10 that the first sensor device 10 is allowed to be replaced by the second sensor device 20. Alternatively, or additionally, the step of determining 360 is based on the identity information 250 identifying the second sensor device 20. Subsequently to the determining 360 step, the processor node 30 registers 370 the second sensor device 20 as a replacement for a first sensor device 10. In the next step, the processor node 30 transfers 380, to the second sensor device 20, a confirmation 190 that the second sensor device 20 has been registered with the processing node 30 as a replacement for the first sensor device 10.

Figure 4:
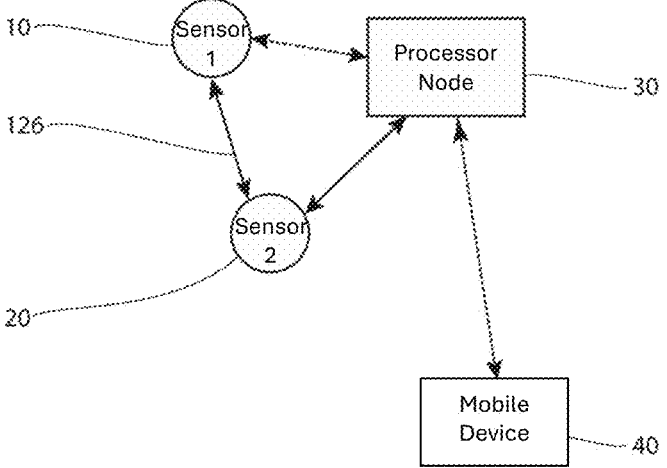
FIG. 4 is a flowchart showing various ways in which the first sensor device, the second sensor device, the processing node, and a mobile device running a user interface communicate.

FIG. 4 shows various ways in which the first sensor device 10, the second sensor device 20, the processing node 30, and a mobile device 40 running a user interface, communicate. The figure illustrates that the direct connection is present between the first 10 and the second 20 sensor devices. It is primarily the second sensor device 20 that communicates with the processing node 30, although the first sensor device 10 may also communicate with the processing node. Additionally, the mobile device 40 running a user interface, in this example a mobile phone, can interact with the processing node 30.

EXAMPLE IMPLEMENTATION

The following is an example implementation of the methods, devices and systems described above.

1. Selective Enabling of the Method

Preferably, the first and second sensor devices, and the processing node, are configured so as to allow, or disallow, the performance of the methods. This is important in cases where a user, for example due to security concerns, might not wish to allow the replacement of the first sensor device.

Accordingly, in the example implementation a flag is set in the processing node by the user as to whether the first sensor device is allowed to be replaced or not. The flag may be transferred to the first sensor device during regular check-ins, such that the first sensor device is configured to perform the method according to the first aspect of the technology proposed herein when detecting the trigger event.

As an option, in the case when a first sensor device has shut down before it has received the flag from the processing node, the first sensor device may still initiate the method, because the processing node performs a check that the method is allowed.

2. Triggering the Method

The replacement process is in this implementation started when a first sensor device is removed from its mounting plate. The first sensor device will then start broadcasting a signal, in this implementation, a special beacon message over Bluetooth LE, indicating that it is a potential target for replacement. The first sensor device will also store the absolute timestamp when it was removed from the plate.

The second sensor device, when powered on and in an unconfigured state, will be scanning for BLE advertisements for replacement targets. When the second sensor device is attached to a mounting plate, it will store the current timestamp. Given that the received signal strength of the first sensor device's beacon message is high enough, and that there are no other second sensor devices in range, the second sensor device will open a Bluetooth connection to the first sensor device. Also, the timestamps between the two sensor devices can be inspected to ensure that the chronology of the removal and attachment events matches, which means that attachment should happen after removal.

Optionally, if the first sensor device has too low battery to operate normally, it is configured to stay in a hibernation mode where it conserves power and monitors the trigger events for replacement. When the conditions are met, the first sensor device will initiate the sensor replacement.

Further optionally, if the first sensor device has shut down completely due to low battery, it can be configured to transmit the beacon message over Bluetooth LE as soon as it is connected to a charger and can power up, the power up being used as a trigger even. Thus, in that situation the first sensor device will boot and uses the dual trigger events of boot and low battery/being connected to a charger, to trigger the replacement method. To make sure this special triggering does not occur unintentionally, stricter range requirements can be introduced, so that the second sensor device must be adjacent to the first sensor device being charged.

3. Authenticating the Second Sensor Device

To prevent unauthorized third parties from connecting and replacing the first sensor device with a rogue or manipulated second sensor device, a mutual authentication procedure is part of the example implementation.

In this example, the authentication is based on HMAC-256 with a shared secret built into the firmware of the sensor devices.

The authentication is implemented as below using the following variables and functions:

response=HMAC-SHA256 (challenge, shared_sensor_swap_secret)

challenge is a nonce (random number) generated by each party and kept for validating the response.

1. The second sensor device generates 'challenge'.
2. The second sensor device sends 'SensorSwapAuthRequest' to the first sensor device with 'challenge'
3. The first sensor device calculates 'response' and generates 'challenge2'

4. The first sensor device responds with 'SensorSwapAuthResponse' with 'challenge2', 'response'
5. The second sensor device validates 'response'.
6. The second sensor device calculates 'response2'.
7. The second sensor device sends 'SensorSwapAuthRequest' with 'response2'
8. The first sensor device validates 'response2"
9. The first sensor device responds with 'SensorSwapAuthResponse' with 'success'

A similar authentication pattern can be implemented using public key encryption and a public key infrastructure, where each device has a certificate and private key for signing challenges, and where each certificate is also signed by a trusted central authority. This removes the need for a distributed secret key.

4. Transferring Identity Information and Connection Information

In this example, for a second sensor device to connect to the processing node (backend), it must receive information from the first sensor device on how it is supposed to connect to a network, here, to a wireless network connected to the internet. This is implemented as follows:

1. The second sensor device sends 'SensorSwapConfigurationRequest' to the first sensor device.
2. The first sensor device responds with 'SensorSwapConfigurationResponse', which contains e.g., wlan_ssid, wlan_security_type, wlan_psk for connecting to the wireless network, as well as backend_port and backend_address to connect to the correct server. It also contains old_device_mac_id, which is the globally unique identity (i.e., the identity information) of the first sensor device.

5. Registering the Second Sensor Device

In this example, the second sensor device connects to the backend (processing node) to register as the replacement for the first sensor device. To prevent a malicious actor from replacing arbitrary first sensor devices in the backend database, or wiping operational first sensor devices, cryptographic operations are used to prove to the backend that the second sensor device has a real time connection to the first sensor device, and to prove to the first sensor device that the backend confirms that that a second sensor device has been registered.

In one example, sensor devices are authenticated using per-device secrets that are written to the sensor devices during manufacturing. These secrets are derived from the public device identities (the globally unique device MAC address), using HMAC such that a holder of the master key can calculate the per-device secret for any device.

The per-device secret, referred to as the device_token, can be used as a key in other HMAC operations. The backend (processing node), with secure access to the master key, can perform the same operation, knowing the device identity, as below given the following variables and functions:

xyz_device_token=HMAC (device_token_master_key, xyz_device_mac_id)+4 bytes key fingerprint server_proof=HMAC (server_challenge+'server'+old_device_challenge, old_device_token)

new_device_proof=HMAC (server_challenge+'new', new_device_token)

old_device_proof=HMAC (server_challenge+'old'+new_device_proof, old_device_token)

server_success_proof=HMAC (server_challenge+'success'+old_device_challenge, old_device_token)

1. The second sensor device opens a secure connection to the backend using, e.g., TLS. The identity of the server can be validated by the second sensor device, by storing a fingerprint of the server certificate in the firmware of the second sensor device.

2. The second sensor device sends a SensorSwapChallengeRequest to the backend, with the identity information of the first sensor device and the second sensor device involved and a challenge generated by the first sensor device.

3. The backend stores the identity information in the connection context.

4. The backend verifies that old_device_id corresponds to a known device, i.e., the first sensor device.

5. The backend verifies that the method according to the first aspect of the technology disclosed herein is enabled for the given old_device_id.

6. The backend calculates server_proof based on the old_device_id and old_device_challenge and generates a server_challenge.

7. The backend sends a SensorSwapChallengeResponse with server_proof and server_challenge.

8. The second sensor device calculates new_device_proof.

9. The second sensor device sends SensorSwapStartRequest with server_proof, server_challenge, new_device_proof to the first sensor device.

10. The first sensor device verifies server_proof, then calculates the old_device_proof.

11. The first sensor device sends old_device_proof to the second sensor device.

12. The second sensor device generates a new communication shared secret new_secret.

13. The second sensor device sends SensorSwapSwitchRequest including old_device_proof, new_device_proof and new_secret.

14. The backend verifies old_device_proof and new_device_proof.

15. The backend updates the device database to link the second sensor device identity information and the new_secret to the backend representation of the second sensor device.

16. The backend calculates server_success_proof.

17. The backend sends SensorSwapSwitchResponse to the second sensor device, including the server_success_proof.

18. The second sensor device stores that it is now registered as an operational first sensor device.

19. The second sensor device closes the connection to the backend, and resumes normal operation.

20. The second sensor device sends a SensorSwapFinalizeRequest to the first sensor device 10, including the server_success_proof.

21. The first sensor device verifies server_success_proof.

22. The first sensor device sends SensorSwapFinalizeResponse to the second sensor device.

23. The second sensor device closes the BLE connection to the first sensor device.

24. The first sensor device removes all settings.

A similar authentication pattern can be implemented using public key encryption and a public key infrastructure, where each entity has a certificate and private key for signing challenges, and where each certificate is also signed by a trusted central authority. This removes the need for having a master secret loaded in the backend.

The invention claimed is:

1. A method performed by a first sensor device registered with a processing node via a network, the method comprising steps of:

i. detecting a trigger event;

ii. broadcasting a signal to a second sensor device, and establishing a direct connection between the first sensor device and the second sensor device;

iii. transferring identity information and connection information to the second sensor device via the direct connection, wherein the identity information identifies the first sensor device to the processing node, and the connection information is used by the first sensor device to connect to the processing node; and iv. receiving, from the second sensor device, confirmation that the second sensor device has been registered with the processing node as a replacement for the first sensor device, and removing the connection information from the first sensor device.

2. The method according to claim 1, wherein the trigger event comprises one or more of:

detecting that the first sensor device is moved by a user;

detecting that the first sensor device is disconnected from a mounting surface;

detecting a user input to the first sensor device;

detecting a reboot of the first sensor device following a shutdown thereof;

detecting that the second sensor device is in proximity to the first sensor device; and detecting a need for replacement of the first sensor device.

3. The method according to claim 1, wherein the trigger event comprises detecting a need for replacement of the first sensor device.

4. The method according to claim 3, wherein the need for replacement of the first sensor device comprises one or more of:

an indication of low battery in the first sensor device;

an indication of a dysfunction of the first sensor device; and an indication of exceeding a predetermined lifetime of the first sensor device.

5. The method according to claim 3, wherein the method further comprises the steps of:

v. querying the second sensor device regarding ability of the second sensor device to meet the need for replacement;

vi. receiving a response from the second sensor device regarding ability of the second sensor device to meet the need for replacement; and vii. determining that the second sensor device is able to meet the need for replacement;

wherein the steps v, vi, and vii are performed prior to step iii.

6. The method according to claim 1, wherein the direct connection is selected from the group consisting of a Bluetooth connection, a Near Field Communication (NFC) connection and an infrared (IR) connection.

7. A method performed by a second sensor device, the method comprising steps of:

i. receiving a broadcasted signal from a first sensor device and establishing a direct connection between the first sensor device and the second sensor device;

ii. receiving first identity information and connection information from the first sensor device via the direct connection, wherein the first identity information identifies the first sensor device to a processing node, and the connection information is used by the first sensor device to connect to the processing node;

iii. connecting to the processing node using the connection information and requesting the registration of the second sensor device with the processing node as a replacement for the first sensor device using the first identity information and second identity information, wherein the second identity information identifies the second sensor device; and iv. transferring, to the first sensor device, a confirmation that the second sensor device has been registered with the processing node as a replacement for the first sensor device.

8. The method according to claim 7, further comprising steps of:

v. receiving, from the first sensor device, a query regarding ability of the second sensor device to meet a need for replacement; and vi. transferring, to the first sensor device, a response regarding ability of the second sensor device to meet the need for replacement.

9. A method performed by a processing node, the method comprising steps of:

i. receiving, from a second sensor device, a request to register the second sensor device as a replacement for a first sensor device, the request comprising first identity information identifying the first sensor device and second identity information identifying the second sensor device;

ii. based on at least one of the first identity information identifying the first sensor device and the second identity information identifying the second sensor device, determining that the first sensor device is allowed to be replaced by the second sensor device;

iii. registering the second sensor device as a replacement for a first sensor device; and iv. transferring, to the second sensor device, a confirmation that the second sensor device has been registered with the processing node as a replacement for the first sensor device.

10. A first sensor device comprising circuitry configured to perform the method according to claim 1.

11. A second sensor device comprising circuitry configured to perform the method according to claim 7.

12. A processing node comprising circuitry configured to perform the method according to claim 9.

13. A non-transitory computer program comprising instructions which, when executed on at least one processor in a first sensor device, cause the first sensor device to carry out the method according to claim 1.

14. A non-transitory computer program comprising instructions which, when executed on at least one processor in a second sensor device, cause the second sensor device to carry out the method according to claim 7.

15. A non-transitory computer program comprising instructions which, when executed in a processing node, cause the processing node to carry out the method according to claim 9.

16. A non-transitory, computer-readable medium encoded with a computer program comprising instructions which, when executed on at least one processor in a first sensor device, cause the first sensor device to carry out the method according to claim 1.

17. A non-transitory, computer-readable medium encoded with a computer program comprising instructions which, when executed on at least one processor in a second sensor device, cause the second sensor device to carry out the method according to claim 7.

18. A non-transitory, computer-readable medium encoded with a computer program comprising instructions which, when executed in a processing node, cause the processing node to carry out the method according to claim 9.

\* \* \* \* \*